No. 757,338. PATENTED APR. 12, 1904.
P. NOLTING.
AMBULANT WATERING APPARATUS.
APPLICATION FILED JULY 20, 1903.
NO MODEL.
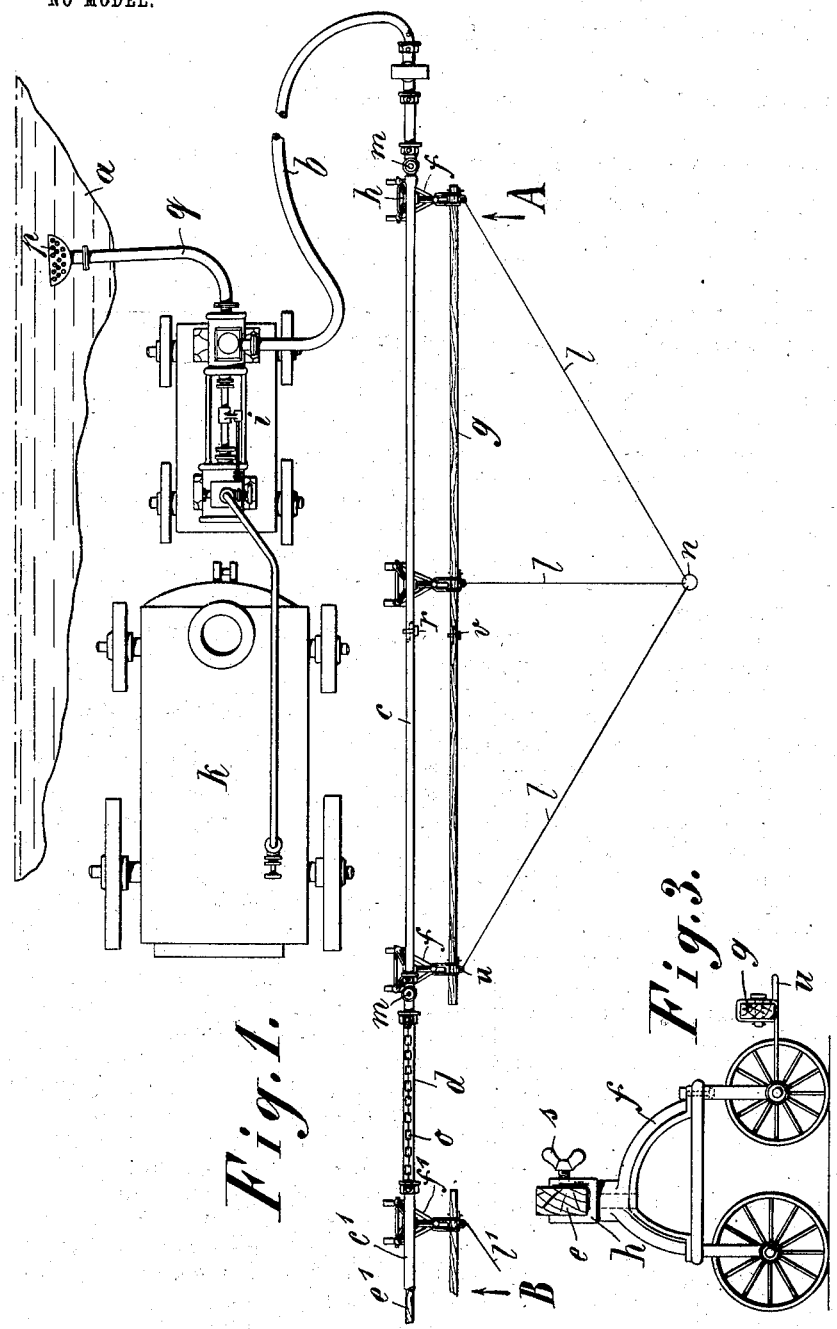
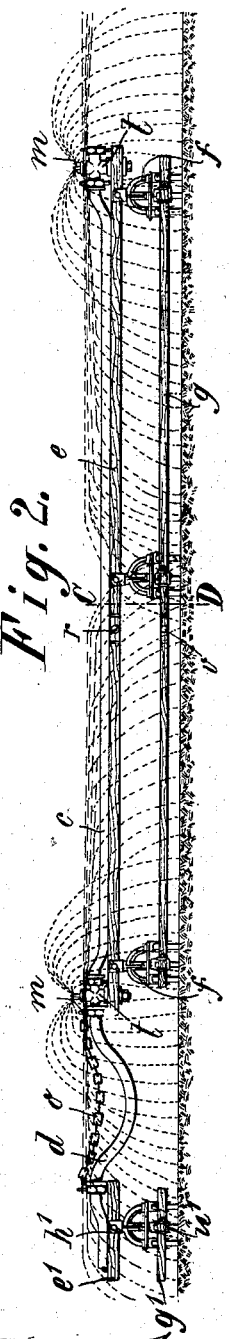
Witnesses:
James L. Norris, Jr.
Inventor
Philipp Nolting
By James L. Norris.
Atty.

No. 757,338. Patented April 12, 1904.

UNITED STATES PATENT OFFICE.

PHILIPP NOLTING, OF BIELEFELD, GERMANY.

AMBULANT WATERING APPARATUS.

SPECIFICATION forming part of Letters Patent No. 757,338, dated April 12, 1904.

Application filed July 20, 1903. Serial No. 166,380. (No model.)

*To all whom it may concern:*

Be it known that I, PHILIPP NOLTING, a citizen of the Empire of Germany, residing at Bielefeld, in the Empire of Germany, have invented a new and useful Ambulant Watering Apparatus, of which the following is a specification.

My invention relates to an ambulant watering apparatus which can be easily handled for the gradual distribution of water or liquid manure over the whole of a pasture-land, meadow, field, and the like; and the objects of my invention are, first, to provide a pipe or hose line, which is connected with a source of water or liquid manure by a hose; second, to divide the pipe or hose line into several sections, which are connected with each other by means of yielding or elastic hoses; third, to provide for each section a plurality of preferably three-wheeled trolleys, which are connected with each other by means of linked rods or laths swiveling on each trolley and supporting the section of the pipe or hose line; fourth, to connect the leading wheels of the trolleys in each section with each other by means of linked rods or laths and with a common draft handle or eye by means of converging ropes or the like, so that the whole section can be shifted by drawing it with the hand, and, fifth, to provide all the sections of the pipe or hose line each with one or several sprinkling or pouring devices. I attain these objects by the apparatus illustrated in a mode of execution in the accompanying drawings, in which—

Figure 1 is a plan showing part of a pond, a portable steam-pump with a portable steam-engine, a connecting-hose, and one complete section and a part of the adjoining section of the pipe or hose line with their trolleys and connections. Fig. 2 is an elevation of the one complete section and the part of the adjoining section seen in the directions of the arrows A and B in Fig. 1; and Fig. 3 is a cross-section on an enlarged scale through the line C D in Fig. 2, the pipe or hose being omitted.

Similar letters of reference refer to similar parts throughout the several views.

*a* denotes a pond, from which the water is sucked by a portable steam-pump *i* through a strainer *p* and a suction-pipe *q*. The steam for driving the steam-pump is assumed to be supplied by a portable steam-engine *k*. The water discharged from the steam-pump *i* is conducted through a hose *b* of suitable length to a pipe or hose line, which is divided into a convenient number of sections. In Figs. 1 and 2 one complete section *c* is shown, which is connected with the adjoining section *c'* by means of a yielding or elastic hose *d*. The section *c* is assumed to be supported by three trolleys *f*, having each three wheels, and in the upper frame a swiveling joint *h*. The three trolleys *f* are connected with each other by a rod or lath *e*, secured in the swiveling joints *h* by means of winged screws *s* or other equivalent means. Preferably the lath *e* is made in two parts, which are linked to each other by a bolt *r*, so as to enable the three trolleys to adapt themselves to the surface of the land. It is the lath *e* on which the pipe or hose section *c* rests and is secured in any known manner. (Not shown in the drawings.) On both ends of the lath *e* two cross-pieces *t t* are secured, which are provided with sprinkling devices *m m* of any approved construction. The poles *u* of the leading wheels of the three trolleys *f* are again connected by a lath *g*, secured in suitable swiveling joints, and the lath *g* is equally made in two parts hinged to each other at *v*. The said three poles *u* are connected with a common draft handle or eye *n* by means of ropes *l l* or the like. It will be evident that by drawing the draft-eye *n* the whole section *c* of the pipe or hose line can be shifted over the land. Preferably the opposed ends of two adjoining sections *c* and *c'* are connected by a chain *o* or the like to protect the connecting-hose *d* against undue strain.

On the end of the section *c'* (shown at Figs. 1 and 2) no sprinkling device is represented, it being assumed that this section *c'* be provided near its middle with a single sprinkling device, so that the several sprinkling devices *m m* of the line are disposed at about equal distances from each other for distributing the water in all directions, as shown.

Of course other sprinkling devices may be employed, if so preferred, and at shorter distances from each other for distributing the water in certain directions, whereby a more uniform watering of the land may be insured.

The apparatus is operated as follows: First, the whole pipe or hose line is placed along one edge of the pasture-land, meadow, field, or the like and the steam-pump is started. When the respective strip of the land beneath the first section $c$ has been sufficiently watered, the operator shifts the first section $c$ through a proper distance by drawing the eye $n$ with his hand forward. Next he moves the second section $c'$ forward in the same manner, and afterward the following sections one after the other. When the last section has been moved on, the operator returns to the first section $c$, which meanwhile will have watered sufficiently the respective strip of the land. He then draws the first section $c$ forward through a proper distance and repeats the same operation with the following sections. He continues with this work until the whole of the land has been watered.

In case liquid manure is to be distributed, the sprinkling devices $m$ $m$ are removed to allow the manure to flow out freely, and the suction-pipe $q$ of the steam-pump is placed in or connected with the source of the liquid manure.

In case the water is supplied under pressure from a central pipe system or a town water-supply or other source, of course the steam-pump $i$ and the portable engine $k$ are dispensed with. The construction of the pump is quite immaterial, also the manner of driving it.

It is evident that owing to the trolleys $f$ the pipe or hose line can be moved not only in a straight direction, but also in any other direction and at pleasure, so that even irregularly-figured lands can be watered. It depends upon the circumstances whether the several sections of the line should be each supported by more than two or three trolleys, as shown.

What I claim as my invention, and desire to secure by Letters Patent, is—

The combination with a source of water or liquid manure, of a hose, a pipe or hose line divided into a plurality of sections connected with each other by hoses, a plurality of distributing devices in said pipe or hose line, a plurality of trolleys for each section of said pipe or hose line, said trolleys being each provided with a swiveling joint and a pole for the leading wheel, a plurality of rods or laths hinged to said swiveling joints of said trolleys for each section of said pipe or hose line for supporting this section, a plurality of rods or laths for pivotally connecting said poles of said trolleys for each section of said pipe or hose line, means for yieldingly connecting the opposed end trolleys of the adjoining sections of said pipe or hose line, a common draft-piece for each section of said pipe or hose line, and means for connecting said common draft-piece with said poles of said trolleys for each section of said pipe or hose line.

In witness whereof I have hereunto set my hand in presence of two witnesses.

PHILIPP NOLTING.

Witnesses:
   HENRY HASPER,
   WOLDEMAR HAUPT.